US007347777B2

(12) United States Patent
Gauselmann

(10) Patent No.: US 7,347,777 B2
(45) Date of Patent: Mar. 25, 2008

(54) GAMING MACHINE WITH SELECTABLE WAYS TO WIN

(75) Inventor: Michael Gauselmann, Espelkamp (DE)

(73) Assignee: Atronic International GmbH, Lübbecke (DE)

( * ) Notice: Subject to any disclaimer, the term of this patent is extended or adjusted under 35 U.S.C. 154(b) by 1010 days.

(21) Appl. No.: 10/291,262

(22) Filed: Nov. 8, 2002

(65) Prior Publication Data

US 2004/0092299 A1 May 13, 2004

(51) Int. Cl.
*A63F 13/00* (2006.01)

(52) U.S. Cl. .......................................... 463/25; 463/20

(58) Field of Classification Search .................. 463/16, 463/20, 25

See application file for complete search history.

(56) References Cited

U.S. PATENT DOCUMENTS 5,332,228 A * 7/1994 Schultz ........................ 463/13
6,176,781 B1 * 1/2001 Walker et al. ................ 463/13
6,190,254 B1 * 2/2001 Bennett ....................... 463/13
6,261,178 B1 * 7/2001 Bennett ....................... 463/20
6,471,208 B2 * 10/2002 Yoseloff et al. ......... 273/143 R
2002/0025849 A1 * 2/2002 Olive .......................... 463/29
2003/0008700 A1 * 1/2003 Gauselmann ................ 463/16
2003/0069062 A1 * 4/2003 Shimizu ...................... 463/20

* cited by examiner

*Primary Examiner*—John M. Hotaling, II
(74) *Attorney, Agent, or Firm*—Patent Law Group LLP; Brian D. Ogonowsky

(57) ABSTRACT

In one embodiment, a video slot machine displays an array of symbols, and awards are granted to the player based on certain combinations of symbols across a pay line or in a pattern. While the reels appear to be spinning, or at any time prior to the final symbol display, the player may designate one or more of the positions in the array to be a special symbol. This special symbol may be a wild card, a high value symbol, a scatter symbol, a multiplier, a bonus game trigger symbol, or any other type of special symbol. The virtual reels stop rotating, and all other symbols in the array are then displayed along with the special symbol in the designated position. The player is then granted an award based upon any winning symbol combinations as affected by the special symbol. In another embodiment, the position of the special symbol in the array is selected automatically by the gaming machine. In another embodiment, the player may identify one or more certain patterns within the array that will form a winning pattern of symbols.

12 Claims, 3 Drawing Sheets

GAMING MACHINE WITH SELECTABLE WAYS TO WIN

FIELD OF THE INVENTION

This invention relates to gaming machines and, in particular, to a particular feature in a game played on a video gaming machine.

BACKGROUND

Video gaming machines that randomly select symbols for display on the video screen and grant awards to a player based upon the displayed symbol combinations are very popular. The symbols may form a 3×1 array, having three symbols in a single row, or the display may be a two dimensional array of symbols having, for example, three rows of symbols in five columns. The granting of an award is based on the symbol combinations across pay lines extending across the array of symbols.

Although the above-described gaming machines are popular, it is desirable to create a game that achieves more player excitement to generate more revenue by the gaming machine.

SUMMARY

In one embodiment, a special feature offered by the present invention is applied to a spinning reels type video slot machine where virtual reels displayed on a video screen appear to rotate and are stopped to reveal an array of symbols. Awards are granted to the player based on certain combinations of symbols across a pay line or in a pattern. While the reels appear to be spinning, or at any time prior to the final symbol display, the player chooses via a touch screen one of the positions in the array to be designated as a special symbol. This special symbol may be a wild card, a high value symbol, a scatter symbol, a multiplier, a bonus game trigger symbol, or any other type of special symbol. The virtual reels stop rotating, and all other symbols in the array are then displayed along with the special symbol in the designated position. The player is then granted an award based upon any winning symbol combinations as affected by the special symbol.

In another embodiment, the position of the special symbol in the array is selected automatically by the gaming machine.

In another embodiment, the player may identify one or more certain patterns within the array that will form a winning pattern of symbols. For example, the player may choose a block pattern of four positions in the array, wherein, if certain symbols are arranged in the block pattern after the virtual reels have stopped rotating, the player wins an award. The amount of the award is based on the likelihood of the winning pattern of symbols occurring. Any other pattern of symbols may be selected by the player. The pattern may be selected by the player using a touch screen or other type of controller.

The offer of the additional features by the gaming machine may be pursuant to the player betting a maximum bet, or by the player paying for the features, or pursuant to the player obtaining a bonus by achieving a special winning combination of symbols in a previous game, or the features may be automatically offered in every game.

The above features may be offered for video games other than a virtual reel type video game such as a video card game, roulette, bingo, keno, or other types of games. Instead of symbols being displayed on a video screen, the symbols may be displayed by mechanical means such as flip cards and motor driven reels.

DETAILED DESCRIPTION

Although the invention can typically be implemented by installing a software program in most types of modern video gaming machines, one particular gaming machine platform will be described in detail.

Figure 1:
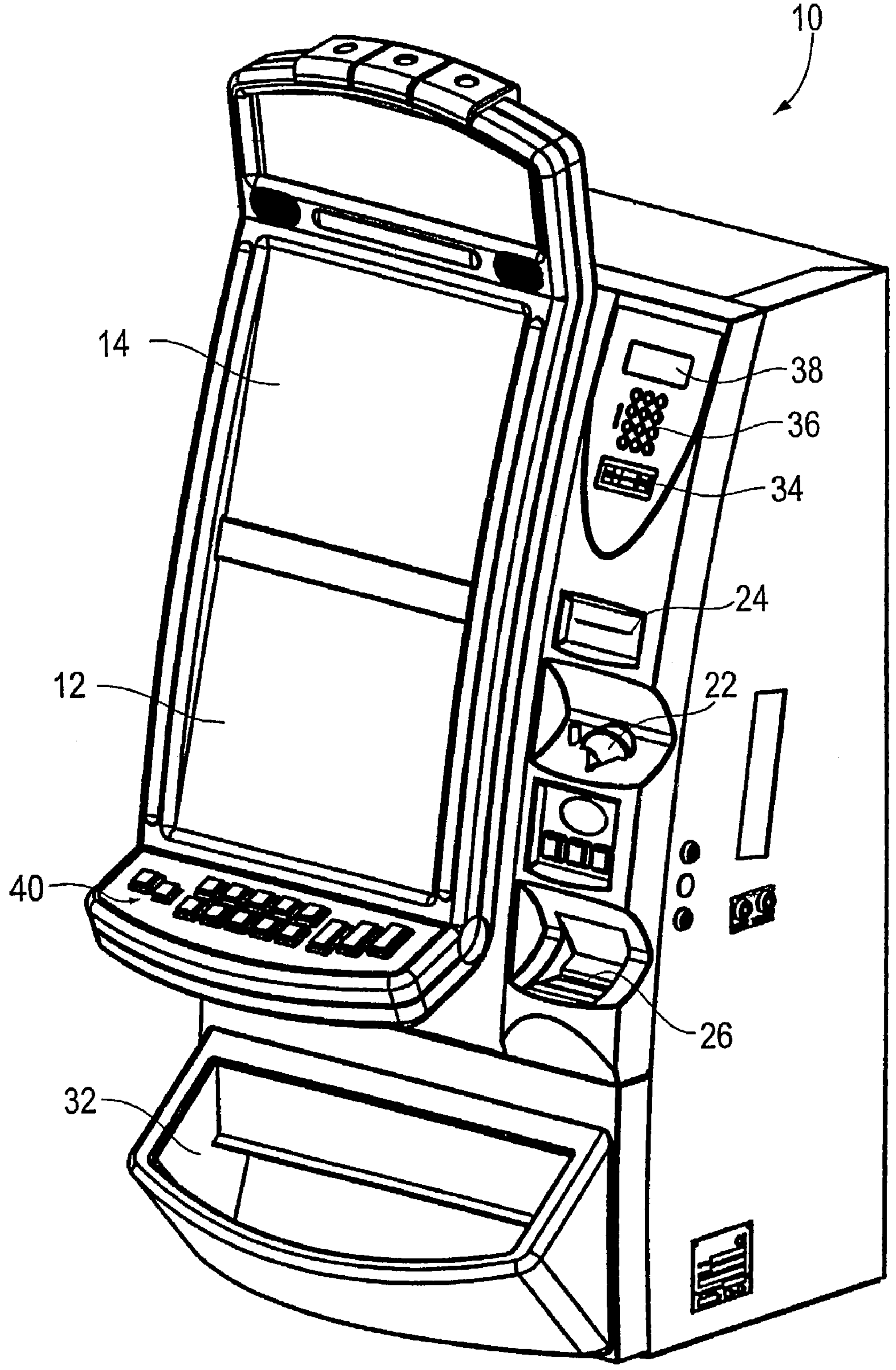
FIG. 1 is a perspective view of one type of video gaming machine that may be programmed to play the game in accordance with the present invention.

FIG. 1 is a perspective view of a gaming machine 10 that incorporates the present invention. Machine 10 includes a display 12 that may be a thin film transistor (TFT) display, a liquid crystal display (LCD), a cathode ray tube (CRT), or any other type of display. Display 12 may be a touch screen for inputting player commands. A second display 14 provides game data or other information in addition to display 12. Display 14 may provide static information, such as an advertisement for the game, the rules of the game, pay tables, pay lines, or other information, or may even display the game itself along with display 12. Alternatively, the area for display 14 may be a display glass for conveying information about the game.

A coin slot 22 accepts coins or tokens in one or more denominations to generate credits within machine 10 for playing games. A slot 24 for an optical reader and printer receives machine readable printed tickets and outputs printed tickets for use in cashless gaming. A bill acceptor 26 accepts various denominations of banknotes.

A coin tray 32 receives coins or tokens from a hopper upon a win or upon the player cashing out.

A card reader slot 34 accepts any of various types of cards, such as smart cards, magnetic strip cards, or other types of cards conveying machine readable information. The card reader reads the inserted card for player and credit information for cashless gaming. The card reader may also include an optical reader and printer for reading and printing coded barcodes and other information on a paper ticket.

A keypad 36 accepts player input, such as a personal identification number (PIN) or any other player information. A display 38 above keypad 36 displays a menu for instructions and other information and provides visual feedback of the keys pressed.

Player control buttons 40 include any buttons needed for the play of the particular game or games offered by machine 10 including, for example, a bet button, a repeat bet button, a play two-ways button, a spin reels button, a maximum bet button, a cash-out button, a display pay lines button, a display payout tables button, select icon buttons, and any other suitable button. Additional buttons that may be used with the invention include symbol position selection buttons, pattern selection buttons, and other control buttons that may be used by the player to carry out the invention, as described in detail below. Buttons 40 may be replaced by a touch screen with virtual buttons, a joystick, a touchpad, or other types of controllers.

Figure 2:
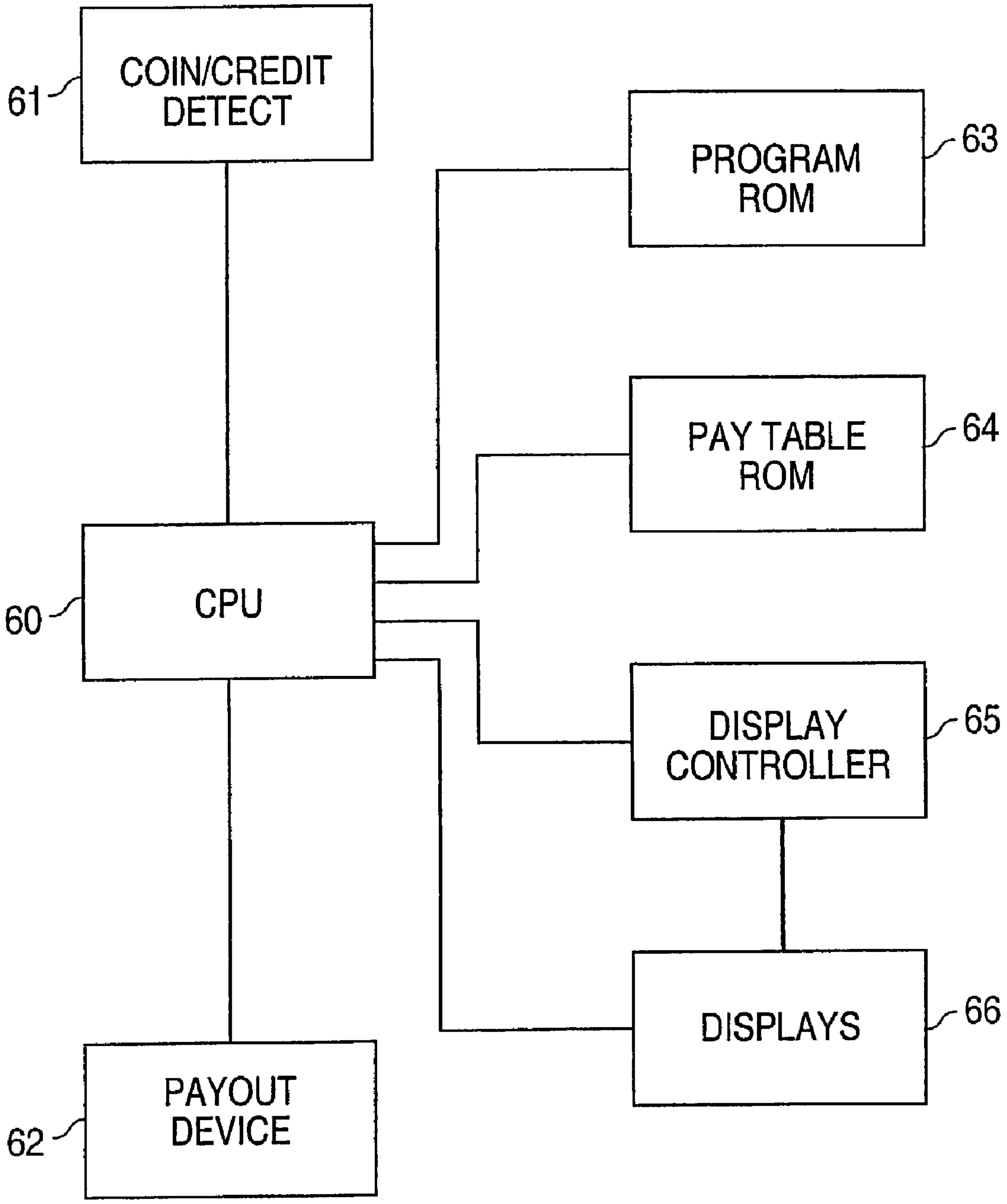
FIG. 2 is a block diagram illustrating various functional units in the machine of FIG. 1.

FIG. 2 illustrates basic circuit blocks in a suitable gaming device. A control unit (CPU 60) runs a gaming program stored in a program ROM 63. A coin/credit detector 61 enables the CPU 60 to initiate a next game. A pay table ROM 64 detects the outcome of the game and identifies awards to be paid to the player. A payout device 62 pays out an award to the player in the form of coins upon termination of the game or upon the player cashing out. A payout may also be in the form of a coded paper ticket, credits on a smart card or magnetic strip card, or in any other form. A display controller 65 receives commands from the CPU 60 and generates signals for the various displays 66. If a display 66 is a touch screen, player commands may be input through the display screen into the CPU 60.

Figure 3:
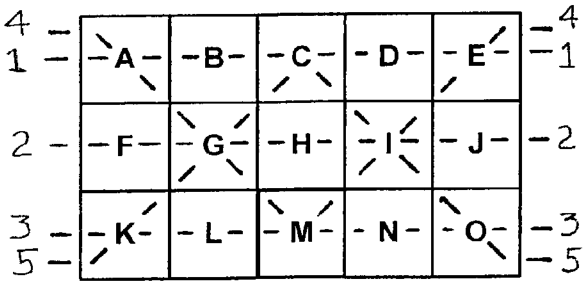
FIG. 3 illustrates a display on the display screen in FIG. 1 of a 5×3 array of randomly selected symbols and five pay lines to be used as an example to illustrate the special features of the game.

FIG. 3 is one example of a screen display on machine 10 showing five different pay lines 1-5 and an array of symbols A-O. After the player makes a bet and presses a spin button, the symbols are randomly selected by a pseudo-random number generator in the gaming machine and displayed on the display screen.

The gaming machine typically shows, either on its display glass or on a video screen, a pay table identifying the various awards that will be paid upon obtaining certain symbol combinations along activated pay lines or in certain patterns. The player may be required to bet additional credits to activate additional pay lines.

Pursuant to the player making a maximum bet, or increasing a wager, or based on any other factor, the player is given the opportunity to select a particular position in the array that will become a certain special symbol.

Figure 4:
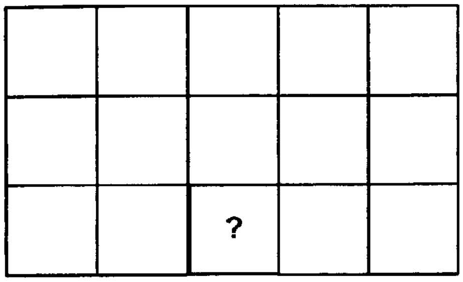
FIG. 4 illustrates the various symbol positions on the video screen, prior to the symbols being selected, and identifies a selected position for a special symbol.

FIG. 4 illustrates the symbol positions in the 5×3 array. During the time that the five vertical reels appear to be spinning, the player makes a selection of one or more of the symbol positions that will be special symbol. This may also occur prior to the game commencing. In FIG. 4, the player has chosen the bottom middle symbol position for the location of the special symbol, shown as a question mark. The special symbol may have any function. Examples of such special symbols include a wild card symbol, a high value symbol, a scatter symbol that can be used to create a winning combination of symbols even if it does not line up on a pay line, a multiplier symbol that multiplies an award for winning combinations across the same pay line, or a trigger for a bonus game if the trigger symbol is in a winning pay line. The scatter symbol may be one where, if a certain number of scatter symbols appear anywhere on the screen, the player gets an award. The multiplier may also be a wild card. The special symbol may have multiple functions. The bonus game may be a free game or a special type of game played on the same or a different video screen. Of course, other special symbols may be used.

In one embodiment, the player is prompted by the video display to select a symbol position by touching an area on the touch screen display. In another embodiment, buttons, a joy stick, a touch pad, or any other type of player controller is used by the player to identify the symbol position.

In another embodiment, the gaming machine automatically selects a position at random using a pseudo-random number generator.

Figure 5:
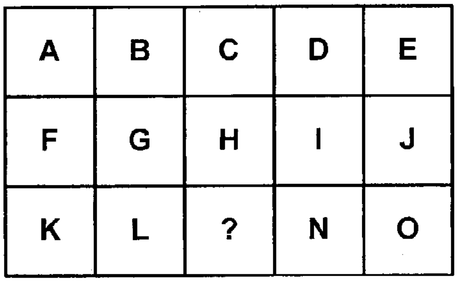
FIG. 5 illustrates the display screen after the various symbols have been randomly selected by the gaming machine and displayed, where the array incorporates the special symbol at the selected position.

As shown in FIG. 5, after the player or the machine has made the selection, the virtual reels are then stopped to display a random arrangement of symbols, where the special symbol is in the array at the selected position. The gaming machine's microprocessor in conjunction with a pay table ROM then grants an award to the player for any winning symbol combinations across the pay lines as affected by the special symbol.

In another embodiment, the player may elect more than one position for the special symbol. The special symbol can be a fixed type of special symbol, such as a wild card, or the gaming machine may cycle through a number of different special symbols either randomly or in a fixed order. In one embodiment, the player may be given the option of selecting the special symbol from a variety of special symbols. The value of the special symbol may also be increased upon certain events happening, such as the player obtaining a certain winning symbol combination. This increased value may be a higher multiplier or the special symbol having a combination of the functions described herein.

The feature of allowing the player or the machine to designate a position for the special symbol may be based on the player wagering a certain amount, or may be as a result of a bonus win by the player, or may occur for each game. A bonus win may be a result of a special winning combination or a special trigger symbol in a previous game.

The invention may also apply to other types of games, such as where the symbols are displayed using individual flip card units. The player may select the special symbol to be displayed by one or more of the flip card units. Other games, such as roulette, bingo, and keno may also use the invention, where a particular spot on the virtual roulette betting table, the bingo card, or the keno card is designated by the player or the machine with a special symbol, such as a multiplier or other suitable symbol.

Figure 6:
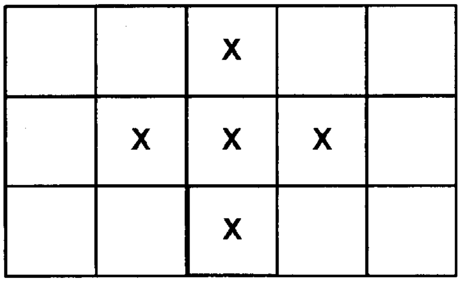
FIGS. 6, 7, and 8 illustrate a pattern selected by the player whereby, if certain symbols are displayed in the positions of the pattern, a special award is granted to the player.

FIG. 6 illustrates another embodiment where the player or the gaming machine selects a pattern. The selected pattern (a pay pattern) may be in addition to, or instead of, the pay lines shown in FIG. 3. The player may get a higher award for a winning combination of symbols in her pay pattern. The player may choose more than one pattern. If certain symbols in the displayed array of symbols are arranged in the pattern selected by the player or by the machine, the player wins a special award. In FIG. 6, the pattern selected is a cross pattern. If certain symbols are displayed in such a pattern, the player wins an award. In one embodiment, the player may win an award if the cross pattern of symbols is formed at any position across the entire array.

Figure 7:
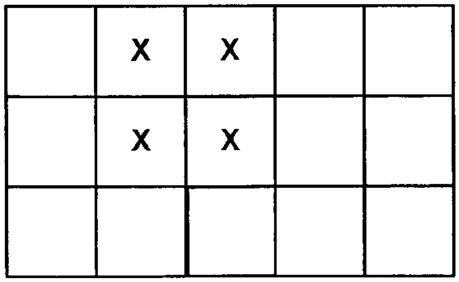

FIG. 7 illustrates a box-type pattern where, for example, if four Kings were displayed in the box pattern, the player would win a special award. In one embodiment, the four Kings may appear anywhere in the array in a box-type pattern and the player would win the award.

Figure 8:
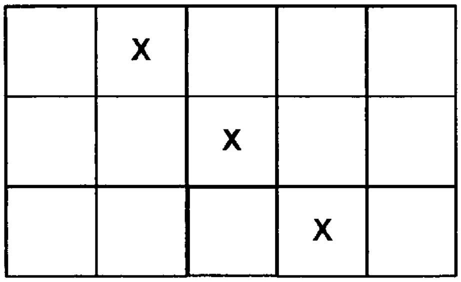

FIG. 8 illustrates a pattern that is simply a diagonal line. An X pattern is another possibility.

The player may choose the pattern(s) during the game or prior to the game either by creating/selecting patterns using a touch screen or by selecting patterns from a menu presented by the machine on the display screen. Other means for identifying a pattern are envisioned.

By the player betting additional amounts, additional patterns may be offered. In one embodiment, the pattern feature is only available when the player makes a maximum bet. Alternatively, the option of choosing patterns may be a bonus for the player obtaining certain special winning combinations of symbols, or a special trigger symbol, in a previous game.

As described above, a video or mechanical gaming machine is augmented with a special feature wherein the player interacts with the display of symbols to either affect the final display of symbols or the patterns for a winning combination of symbols. Numerous other embodiments are envisioned using these concepts.

Having described the invention in detail, those skilled in the art will appreciate that, given the present disclosure, modifications may be made to the invention without departing from the spirit of the inventive concepts described herein. Therefore, it is not intended that scope of the invention be limited to the specific embodiments illustrated and described.

What is claimed is:

1. A gaming method wherein an array of symbols is displayed and an award is granted based on the displayed array of symbols, the method comprising:

designating at least one particular symbol position in the array as a special symbol offered by a gaming machine, the designating being by the gaming machine receiving a signal from a player controller designating the at least one particular symbol position in the array selected by the player;

pseudo-randomly selecting symbols by the gaming machine to fill in positions in the array; and granting an award to the player based upon the symbols displayed including the special symbol.

2. The method of claim 1 wherein designating at least one particular symbol position in the array for a special symbol comprises the player selecting the at least one position using a touch screen.

3. The method of claim 1 wherein designating the at least one particular symbol position in the array occurs during the gaming machine simulating the rotation of virtual reels having symbols printed thereon.

4. The method of claim 1 wherein granting the award is based upon winning combinations of symbols across at least one pay line.

5. The method of claim 1 wherein the special symbol has a wild card function.

6. The method of claim 1 wherein the special symbol is a high value symbol.

7. The method of claim 1 wherein the special symbol is a scatter symbol.

8. The method of claim 1 wherein the special symbol has a multiplier function.

9. The method of claim 1 wherein the special symbol triggers a bonus game if the special symbol forms part of a winning symbol combination.

10. The method of claim 1 wherein the array of symbols is a 5×3 array.

11. A gaming device comprising:

a display area for displaying a game, the game displaying an array of symbols, certain combinations of symbols across at least one pay line determining an award to a player; and at least one processor for carrying out the following method:

designating at least one particular symbol position in the array for a special symbol offered by a gaming machine, the designating being by the gaming machine receiving a signal from a player controller designating the at least one particular symbol position in the array selected by the player;

pseudo-randomly selecting symbols by the gaming machine to fill in positions in the array; and granting an award to the player based upon the symbols displayed including the special symbol.

12. The device of claim 11 further comprising a player controller for designating the at least one particular symbol position in the array selected by the player.

* * * * *